US008918874B2

(12) United States Patent
Turbin

(10) Patent No.: US 8,918,874 B2
(45) Date of Patent: Dec. 23, 2014

(54) MALWARE SCANNING

(75) Inventor: Pavel Turbin, Jokela (FI)

(73) Assignee: F-Secure Corporation, Helsinki (FI)

( * ) Notice: Subject to any disclaimer, the term of this patent is extended or adjusted under 35 U.S.C. 154(b) by 413 days.

(21) Appl. No.: 12/800,889

(22) Filed: May 25, 2010

(65) Prior Publication Data

US 2011/0296525 A1    Dec. 1, 2011

(51) Int. Cl.
*G06F 21/00* (2013.01)
*G06F 21/56* (2013.01)

(52) U.S. Cl.
CPC .................................. *G06F 21/566* (2013.01)
USPC .............................................. 726/23; 726/22

(58) Field of Classification Search
CPC ................................................... G06F 21/566
USPC ........................................................ 726/22–23
See application file for complete search history.

(56) References Cited

U.S. PATENT DOCUMENTS

| | | | | |
|---|---|---|---|---|
| 6,594,686 | B1 * | 7/2003 | Edwards et al. | 709/203 |
| 6,928,555 | B1 * | 8/2005 | Drew | 726/24 |
| 7,188,367 | B1 * | 3/2007 | Edwards et al. | 726/24 |
| 7,681,237 | B1 * | 3/2010 | Spiegel et al. | 726/24 |
| 2003/0079145 | A1 * | 4/2003 | Kouznetsov et al. | 713/200 |
| 2004/0003284 | A1 * | 1/2004 | Campbell et al. | 713/201 |
| 2005/0149749 | A1 * | 7/2005 | Van Brabant | 713/200 |
| 2006/0101263 | A1 * | 5/2006 | Costea et al. | 713/164 |
| 2006/0101476 | A1 * | 5/2006 | Robert | 719/328 |
| 2006/0161985 | A1 * | 7/2006 | Zhao | 726/24 |
| 2009/0070879 | A1 * | 3/2009 | Saika | 726/24 |

FOREIGN PATENT DOCUMENTS

EP    1429247 A2    6/2004

OTHER PUBLICATIONS

"Intel® Hyper-Threading Technology", Technical User's Guide, Jan. 2003, 44 pgs.
"Multi-Threaded Programming With POSIX Threads"; Apr. 1, 2003; whole document (56 pages); Retrieved from the Internet: http://multicoreinfo.com/research/misc/MultiThreaded-Programming-With-POSIX.pdf.
"Solaris Tunable Parameters Reference Manual"; May 31, 2002; whole document (174 pages); Retrieved from the Internet: http://docs.oracle.com/ed/E19683-01/806-7009/806-7009.pdf.

* cited by examiner

*Primary Examiner* — Chau Le
(74) *Attorney, Agent, or Firm* — Harrington & Smith

(57) ABSTRACT

According to a first aspect of the present invention there is provided a method of scanning a computer system for malware. The method includes determining when an application being executed on the computer system is attempting to open a file, adding data written to the open file by the application into a malware scanner queue, and ensuring that the application has been notified that the file has been closed before scanning the queued file data to determine if it relates to potential malware.

19 Claims, 3 Drawing Sheets

MALWARE SCANNING

TECHNICAL FIELD

The present invention relates to a method and apparatus for performing malware scanning. In particular, the present invention relates to a method and apparatus for optimising the performance of a computer system that performs on-access malware scanning.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious or unwanted software.

Many end users make use of anti-virus software to detect and possibly remove malware. In order to detect a malware file, the anti-virus software must have some way of identifying it amongst all the other files present on a device. Typically, this requires that the anti-virus software has a database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

Using approaches that solely rely on signature scanning to detect malware still leaves computers vulnerable to "unknown" or "zero day" malware programs/applications that have not yet been analysed for their signature. To address this issue, in addition to scanning for malware signatures, most anti-virus applications additionally employ heuristic analysis. This approach involves the application of general rules intended to distinguish the behaviour of any malware from that of clean/legitimate programs. For example, the behaviour of all programs/applications on a PC may be monitored and if a program/application attempts to write data to an executable file, the anti-virus software can flag this as suspicious behaviour.

Anti-virus applications typically provide on-demand scanning in which the user of a computer system determines when the files on the computer system should be scanned for the presence of malware. In on-demand scanning the user can activate the scanning process manually, or can configure the scanning process to start in certain circumstances. For example, the user could configure the anti-virus program to scan particular folders on a weekly basis, and to scan all the files on a computer system once a month. In addition, these anti-virus programs usually also provide real-time protection against malware by performing on-access scanning. In on-access scanning the computer system is monitored for the presence of malware by scanning files automatically in the background as and when the files are accessed.

When an application requires that some operation is performed on a file (e.g. that a file be opened, closed, or some data be written to the file etc), the application sends an input/output (I/O) request to the I/O system. The I/O system consists of a set of layered drivers whose actions are coordinated by the I/O manager.

The I/O manager manages communication between drivers. All drivers supply a standard set of services that the I/O manager can call. This uniform interface allows the I/O manager to communicate with all drivers in the same way. Drivers communicate with each other using data structures called I/O request packets (IRP). The drivers do not pass IRPs to each other directly. Instead, they pass the packets to the I/O manager, which delivers them to the appropriate destination drivers. The I/O manager therefore:

- accepts I/O requests, which usually originate from user-mode applications;
- creates IRPs to represent the I/O requests.
- routes the IRPs to the appropriate drivers;
- tracks the IRPs until they are completed; and
- returns the status to the original requester of each I/O operation.

The I/O system allows separate drivers to implement each logically distinct layer of I/O processing. For example, drivers in the lowest layer manipulate the computer's physical devices (these are called device drivers). Other drivers are then layered on top of the device drivers in a driver stack.

On-access scanning is therefore typically implemented using a filter driver of some form, or a minifilter implemented by a filter manager. A filter driver or minifilter can fit in at any layer of the driver stack and filters/intercepts IRPs passed to it from the next-higher or next-lower driver. Anti-virus programs therefore typically use a filter driver or minifilter to intercept requests to access a file, made by or on behalf of an application to the file system. An anti-virus program then intercepts any data that the application attempts to write to the file, and performs a scan of that data. However, the scanning of the file by the anti-virus program is performed synchronously, such that the operation of writing the data to the file cannot be completed whilst the anti-virus program is scanning the data. As such, the application's execution is blocked/prevented from progressing until the scan has been completed.

FIG. 1 illustrates the typical process implemented by a computer system when an anti-virus program performs synchronous on-access scanning. The steps performed are as follows:

A1. As part of its execution, an application requires that some data is written to a file. The application therefore requires that a new file or an existing file be opened. In Microsoft® Windows® the application calls a CreateFile function in order to create a new file or open an existing file. The CreateFile function returns a file handle that is associated with the file until either the process terminates or the handle is closed using the CloseHandle function. Any subsequent requests to open the file with the CreateFile function might fail until the handle is closed.

A2. The CreateFile function in turn calls the I/O manager that generates an I/O Request Packet (IRP) on behalf of the user-mode application, the IRP having the IRP_MJ_CREATE function code.

A3. The anti-virus program providing the on-access scanning functionality intercepts the IRP_MJ_CREATE request sent to the file system by the I/O manager. In doing so, the anti-virus program can identify when a new file is created or an existing file opened. The filter driver then sends the request on to its intended target, the computer's file system.

A4. The file system returns the IRP with a status indicating that the operation was successful, including the file handle of the file, completing the IRP.

A5. The filter driver intercepts the IRP returned in response in order to learn the file handle returned by the file system.

A6. The I/O manager then notifies the application that the CreateFile function was successful.

A7. Once the file has been created and/or opened the application then begins writing data to the file. In Microsoft® Windows® the application generates a WriteFile function call in order to write data to the open file specified by the file handle.

A8. The WriteFile function in turn calls the I/O manager that generates an IRP on behalf of the user-mode application, the IRP having the IRP_MJ_WRITE function code and identifying/pointing to the data to be written.

A9. The file system writes the identified data to the file and returns the IRP with a status indicating that the operation was successful, completing the IRP.

A10. The I/O manager then notifies the application that the WriteFile function was successful.

A11. Once the application has received the notification that the WriteFile function has been successful, it then calls a CloseHandle function in order to close the open file handle for the file.

A12. The CloseHandle function in turn calls the I/O manager that generates an IRP on behalf of the user-mode application, the IRP having either the IRP_MJ_CLEANUP or IRP_MJ_CLOSE function code.

A13. The filter driver intercepts the IRP_MJ_CLEANUP or IRP_MJ_CLOSE request made using the file handle and requests that a malware scanner of the anti-virus program scan the file identified by the file handle.

A14. The malware scanner then scans the file. If the result of the scan indicates that the file is clean (i.e. the file is not identified as being related to some form of malware), the malware scanner notifies the filter driver.

A15. The filter driver then forwards the intercepted IRP_MJ_CLEANUP or IRP_MJ_CLOSE request on to the file system.

A16. The file system closes the file and returns the IRP with a status indicating that the operation was successful, completing the IRP.

A17. The I/O manager then notifies the application that the CloseHandle function was successful.

A18. Only once the application has received a notification that the CloseHandle function has been successful will it then be able to continue with its execution by writing data to another file.

In preventing the closure of the file handle until the file has been scanned for malware, this synchronous process of on-access scanning blocks the application from writing data to any other file until the malware scan has been completed. In other words, the application must wait until the malware scan has been completed before it can continue processing the file. As such, the anti-virus program prevents the execution of the application from progressing, slowing the rate at which it can complete its tasks, and therefore impacts on the performance of the computer system.

SUMMARY

It is an object of the present invention to provide a method of performing on-access malware scanning on a computer system that minimises the delay introduced into the execution of applications running on the computer system, therefore optimising the performance of the computer system.

According to a first aspect of the present invention there is provided a method of scanning a computer system for malware. The method comprises determining when an application being executed on the computer system is attempting to open a file, adding data written to the open file by the application into a malware scanner queue, and ensuring that the application has been notified that the file has been closed before scanning the queued file data to determine if it relates to potential malware.

Embodiments of the invention provide that an anti-virus program can perform on-access scanning of a file without the need to block the execution of the application accessing the file until the malware scan has been completed.

The step of determining when an application being executed on the computer system is attempting to open a file may comprise intercepting messages that request the creation of a new file or opening of an existing file. The method may further comprise intercepting a response to any detected file open request messages in order to obtain a handle assigned to the file. The file open request messages may be I/O Request Packets, IRP, containing an IRP_MJ_CREATE function code.

The step of adding data written to the open file by the application into a malware scanner queue may comprise copying the data as it is written to the open file by the application, and adding the copied file data into the malware scanner queue. The data may be copied by intercepting messages that request data be written to the file, and copying the data identified in the request. The write data request messages may be IRPs containing an IRP_MJ_CREATE function code, and the data may be copied into a cache memory of the computer system.

The method may further comprise determining if the application has initiated closure of the file before adding the copied file data the malware scanner queue. The step of determining if the application has initiated closure may comprise intercepting messages that request the file be closed. These file close request messages may be IRPs containing an IRP_MJ_CLEANUP or IRP_MJ_CLOSE function code.

The step of adding data written to the open file by the application into a malware scanner queue may comprise recording a location of the file, and adding the recorded file location into the malware scanner queue. The scanning of the queued file data may then comprise scanning the file data from the recorded file location.

The step of recording a location of the file may comprise intercepting messages that request data be written to the file, and recording the file location identified in the request. The file location may be recorded in a cache memory of the computer system. The write data request messages may be IRPs containing an IRP_MJ_CREATE function code.

The method may further comprise determining if the application has initiated closure of the file before adding the file location into the malware scanner queue. The step of determining if the application has initiated closure may comprise intercepting messages that request the file be closed. The file close request messages may be IRPs containing an IRP_MJ_CLEANUP or IRP_MJ_CLOSE function code.

After the application has initiated closure of the file, the queued file data may only be scanned when the amount of data in the queue exceeds a threshold. Alternatively, after the application has initiated closure of the file, the queued file data may only scanned when the age of the file data exceeds a threshold. The method may then further comprise, when adding data written to the open file by the application into a malware scanner queue, recording the time at which the file data was written to the file.

The interception of messages may be implemented using a filter unit. The scanning of the queued file data may be implemented using a malware scanner. The filter unit and malware scanner may be components of an anti-virus program.

According to a second aspect of the present invention there is provided a computer program comprising computer program code means adapted to perform the following steps:

determine when an application being executed on the computer system is attempting to open a file;

add data written to the open file by the application into a malware scanner queue; and ensure that the application has been notified that the file has been closed before scanning the queued file data to determine if it relates to potential malware.

According to a third aspect of the present invention there is provided a computer program as outlined above embodied on a computer readable medium.

According to a fourth aspect of the present invention there is provided a computer system configured to scan files for malware. The computer system comprises a filter unit for determining when an application being executed on the computer system is attempting to open a file, adding data written to the open file by the application into a malware scanner queue, and ensuring that the application has been notified that the file has been closed before the queued file data is scanned to determine if it relates to potential malware. The computer system may further comprise a malware scanner for scanning the queued file data.

DETAILED DESCRIPTION

In order to at least partially overcome the problems described above, it is proposed here to improve the performance of a computer system by performing asynchronous on-access malware scanning, in which the application's execution is not blocked while the operation is being performed. This asynchronous scanning is achieved by making a copy of any data that is being written to a file by an application, and storing the copy of the file data in a memory cache. The writing of this data to the file can then continue without the need to wait until after the malware scan is performed. The data in the cache can then be scanned for malware when appropriate. By providing that the application's execution is not blocked while the malware scanning operation is being performed, the anti-virus program minimises the delay introduced by the on-access malware scanning, thereby optimising the performance of the computer system.

Figure 1:
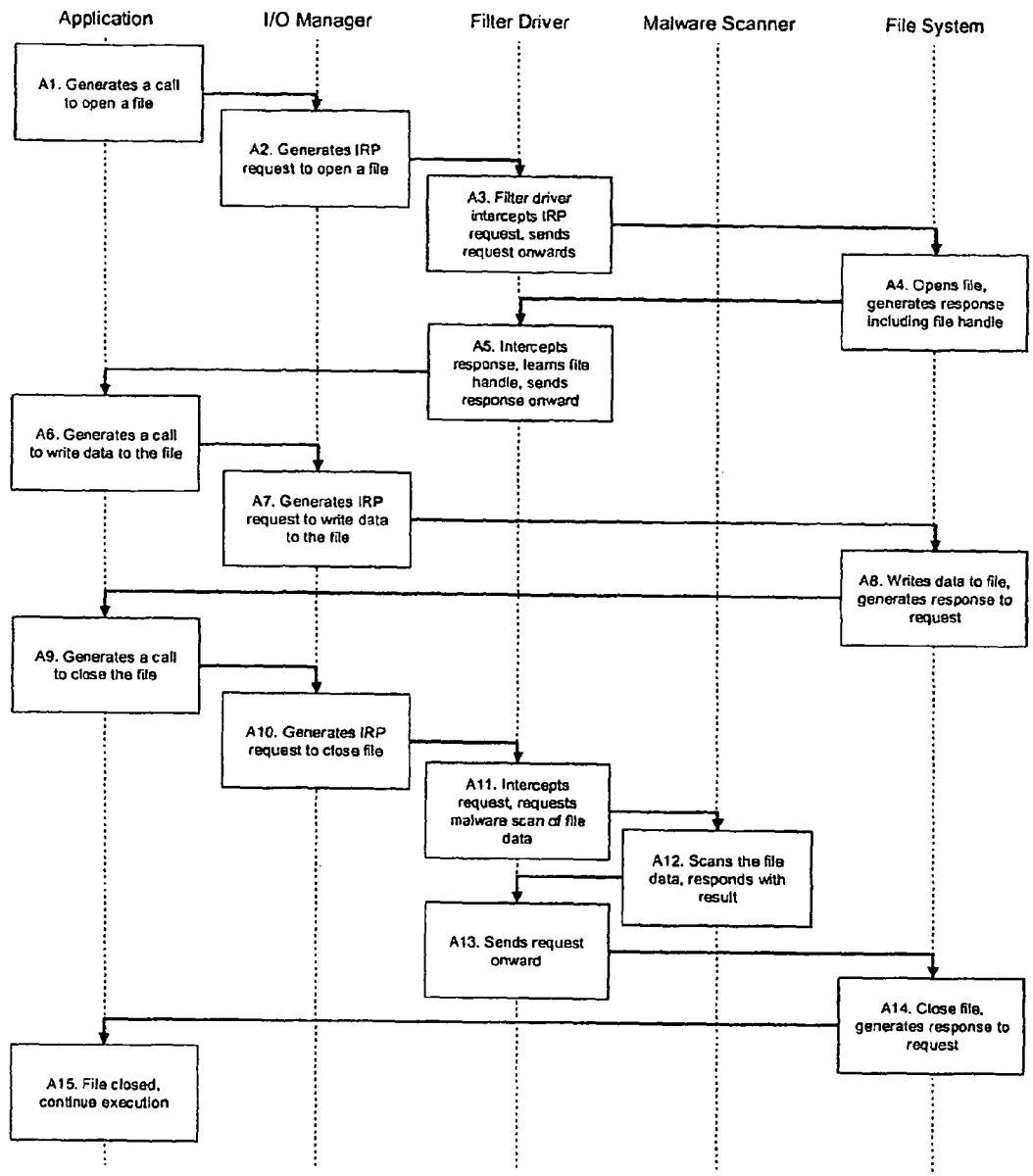
FIG. 1 is a flow diagram illustrating a process of performing on-access malware scanning.
Figure 2:
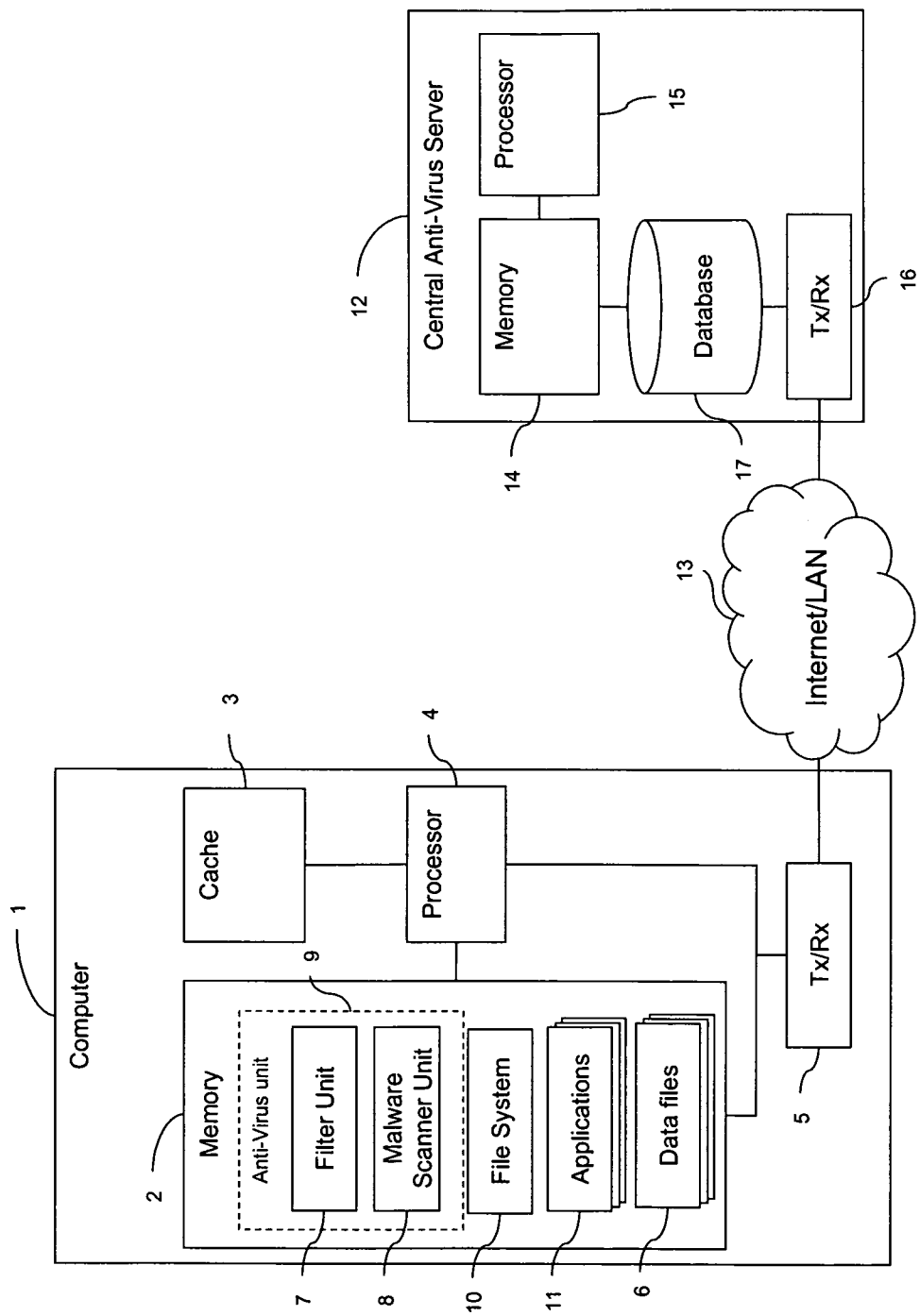
FIG. 2 illustrates schematically a computer system according to an embodiment of the present invention.

FIG. 2 illustrates schematically a computer system 1 according to an embodiment of the present invention. The computer system 1 can be implemented as a combination of computer hardware and software. The computer system 1 comprises a memory 2, a cache 3, a processor 4 and a transceiver 5. The memory 2 stores all of the files required by the computer system 1. The files stored in the memory 2 include the various programs/executable files that are implemented by the processor 3, as well as any data files 6. The programs/executable files stored in the memory 2, and implemented by the processor 4, include a filter unit 7 and a malware scanner unit 8, each of which can be sub-units of an anti-virus unit 9, as well as the file system 10 and any other programs/applications 11. The data files 6 stored in the memory 2 can include application data files, malware definition data files, files containing heuristic analysis rules, white lists, black lists etc. The cache 3 provides a temporary storage unit for storing data that is to be scanned by the malware scanner unit 8. The transceiver 5 is used to communicate with a central anti-virus server 12 over a network 13 such as the Internet or a LAN.

The central anti-virus server 12 is typically operated by the provider of the anti-virus unit 8 that is run on the computer 1. Alternatively, the central anti-virus server 12 may be that of a network administrator or supervisor, the computer 1 being part of the network for which the supervisor is responsible. The central anti-virus server 12 can be implemented as a combination of computer hardware and software. The central anti-virus server 12 comprises a memory 14, a processor 15, a transceiver 16 and a database 17. The memory 14 stores the various programs/executable files that are implemented by the processor 15. The transceiver 16 is used to communicate with the computer system 1 over the network 13. The database 17 stores the latest malware definition data, heuristic analysis rules, white lists, black lists etc.

Figure 3:
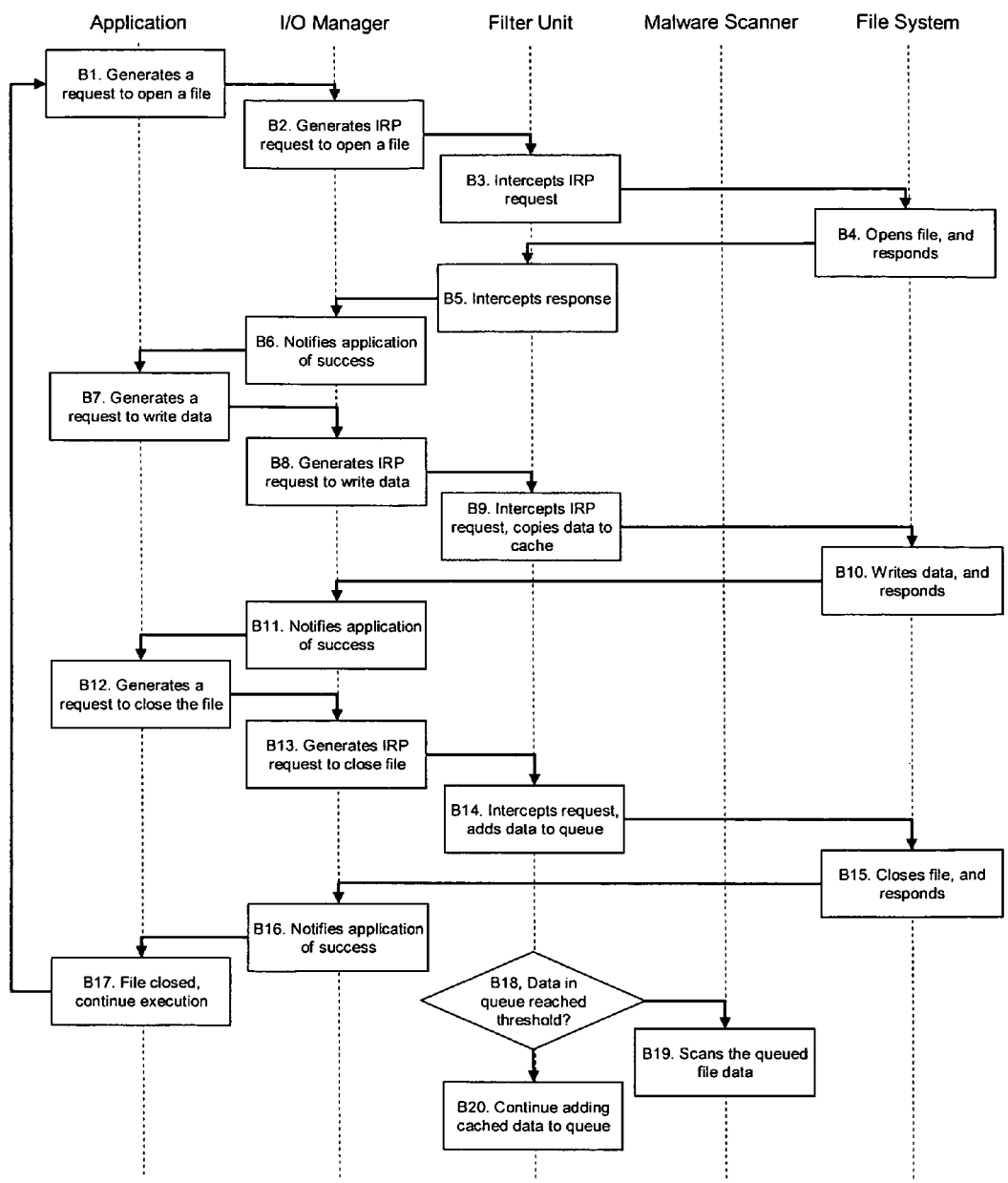
FIG. 3 is a flow diagram illustrating a process of performing on-access malware scanning according to an embodiment of the present invention.

FIG. 3 is a flow diagram further illustrating the process of performing on-access malware scanning according to an embodiment of the present invention. The steps performed are as follows:

B1. As part of its execution, an application requires that data be written to a new file or an existing file. In order to create a new file or open an existing file, the application calls the CreateFile function.

B2. The CreateFile function in turn calls the I/O manager that generates an IRP on behalf of the user-mode application, the IRP having the IRP_MJ_CREATE function code.

B3. The filter unit associated with the anti-virus program intercepts the IRP_MJ_CREATE request made to the file system, and thereby determines that a new file is to be created or an existing file opened. The filter unit then sends the request on to the computer's file system.

B4. The file system returns the IRP with a status indicating that the operation was successful, and including the file handle of the file, completing the IRP.

B5. The filter unit intercepts the IRP returned in response in order to learn the file handle returned by the file system before sending the response on to the application.

B6. The I/O manager then notifies the application that the CreateFile function was successful.

B7. Once a file has been created and/or opened, the application then begins writing data to the file, calls a WriteFile function using the file handle.

B8. The WriteFile function in turn calls the I/O manager that generates an IRP on behalf of the user-mode application, the IRP having the IRP_MJ_WRITE function code and indicating/identifying the data to be written.

B9. The filter unit intercepts the IRP_MJ_WRITE request made using the file handle and copies the data to be written to the file into the cache. The filter unit then forwards the intercepted request on to the file system such that the data can be written to the specified file.

B10. The file system writes the identified data to the file and returns the IRP with a status indicating that the operation was successful, completing the IRP.

B11. The I/O manager then notifies the application that the WriteFile function was successful.

B12. Once the application has received the notification that the WriteFile function has been successful, it then calls a CloseHandle function to close the open file handle for the file.

B13. The CloseHandle function in turn calls the I/O manager that generates an IRP on behalf of the user-mode application, the IRP having either the IRP_MJ_CLEANUP or IRP_MJ_CLOSE function code.

B14. The filter unit intercepts the IRP_MJ_CLEANUP or IRP_MJ_CLOSE request made using the file handle and adds the cached file data to a queue of data that is due to be scanned for malware. The malware scanner queue comprises the file data that has been cached and is ready to be scanned. In order to add the file data to the queue, the filter driver registers the file handle for asynchronous processing. The filter unit then forwards the intercepted IRP_MJ_CLEANUP or IRP_MJ_CLOSE request on to the file system.

B15. The file system closes the file and returns the IRP with a status indicating that the operation was successful, completing the IRP.

B16. The I/O manager then notifies the application that the CloseHandle function was successful.

B17. Once the application has received a notification that the CloseHandle function has been successful it is then able to continue with its execution by writing data to another file or performing any other actions. If the application continues by writing data to another file or to the same file then steps B1 to B16 are repeated.

B18. Once the amount of data in the queue reaches a predefined maximum threshold, or the oldest item of data in the queue reaches a predefined maximum age, the filter unit requests that the malware scanner performs a scan of that file data stored in the cache that is currently in the malware scanner queue.

B19. The malware scanner then scans the queued file data stored in the cache.

B20. If the amount of data in the queue has not yet reached the predefined maximum threshold, nor the oldest item of data in the queue reached the predefined maximum age, then the filter continues to store data that is written to files by the application and adds this file data to the malware scanner queue.

Alternatively, instead of hooking into the process of writing data to the file and copying the file data to the cache, the filter unit could be configured to simply capture information about the file, such as the file handle and the path to the file, by intercepting the various requests and responses sent from or to the application whilst the file is open. Then, once the file is closed, the file handle released, and the IRP_MJ_CLEANUP or IRP_MJ_CLOSE request is completed, the file path can be added to the malware scanner queue by the filter unit such that the malware scanner can then scan the actual file data from the location at which it is stored.

As a further alternative, when the filter unit receives the IRP_MJ_CLEANUP request, the filter unit could be configured not to pass the IRP on toward the file system, but to mark the IRP as STATUS_PENDING, store the pointer to IRP and complete the current processing. The application would then be notified that the CloseHandle function has been completed and would therefore able to continue its execution. However, as the file system has not received the IRP_MJ_CLEANUP file, the file object associated with the file handle remains valid such that the file system is able to read the data from the file. Subsequently, when the malware scanner requires the file data in order to perform the asynchronous scan, it sends a request for the data to the filter unit. The filter unit then generates an IRP_MJ_READ request using parameters from the IRP_MJ_CLEANUP. When the malware scan has been completed, the original IRP_MJ_CLEANUP is sent on to the file system to be completed and the file handle is closed.

The filter unit should record an indication of the time at which the file data was written to the file. The filter unit can then use the time information to determine if the age of the oldest file data within the malware scanner queue has exceeded a predefined time limit, and therefore when the queued file data should be scanned by the malware scanner. For example, this time limit could vary between one second and ten seconds. In addition, the filter unit could record the path of the file as this could be used by the malware scanner during the scanning procedure (e.g. as the location of a file may be indicative as to whether a file may or may not be malware). Furthermore, the anti-virus program can also make use of the file location information if and when a file has been identified as relating to potential malware by the malware scanner, in order to perform any disinfection and/or quarantine operations.

Optionally, the anti-virus program could be configured to limit the maximum amount of data that can be stored in the queue by the filter driver. Once the amount of data within the queue reaches this maximum limit, the filter unit would be configured to send a request to the malware scanner requesting that the queued file data is scanned. In addition, if amount of data written to a single file exceeds the maximum size of the cache and/or queue then the filter unit could be configured to request that the malware scanner perform a synchronous scan of the new data. The malware scanner could then scan the data as it is written to the file, whilst the execution of the application is prevented from progressing until the scan has been completed.

The filter unit would also be configured to determine if the application is attempting to modify, overwrite or delete the data currently written to a particular file, and which has been added to the malware scanner queue. The filter unit would then be configured to take any action deemed appropriate. For example, if the filter unit were to determine that an application is attempting to write new data to an existing file, whilst the data currently written to that file is waiting to be scanned by the malware scanner, then the filter unit could be configured to remove the current file data from the queue (and, if required, from the cache) and request that the malware scanner perform a synchronous scan of the new data. The malware scanner would then scan the new data as it is written to the file, whilst the execution of the application is prevented from progressing until the scan has been completed. Furthermore, if the filter unit were to determine that an application is attempting to delete a file whilst the data currently written to that file is waiting to be scanned, then the filter unit can be configured to remove that file's data from the queue (and, if required, from the cache).

Alternatively, if the filter unit has made a copy of the file data into a cache, and the filter unit determines that the application is attempting to modify, overwrite or delete that data, then the filter unit could be configured to either:

Retain the current file data from the both the cache and the queue, and add the newly written file data to the cache and the queue as appropriate. The malware scanner would then scan both the most recent file data and the data that preceded it.

Remove the current file data from the both the cache and the queue, and add the newly written file data to the cache and the queue as appropriate. The malware scanner would then only scan the most recent file data.

Similarly, if an application continues writing data files such that the amount of data in the malware scanning queue reaches the threshold maximum size before the malware scanner has completed the scanning of the data in the preceding malware scanning queue, then the filter unit could be configured to either:

Block any further execution of the application until the malware scanner has completed the scanning of the data in the preceding malware scanning queue, such that the file data currently in the malware scanning queue can then be passed to the malware scanner for scanning, freeing the malware scanner queue to accept more file data.

Request synchronous malware scanning of any succeeding file data until there is sufficient space within the malware scanner queue to accept more file data The methods described above provide that an anti-virus program can perform on-access scanning of a file without the need to block the application accessing the file from progressing until the malware scan has been completed. This method therefore optimises the performance of a computer system that is configured to perform on-access malware scanning of files. In addition, when storing the file data within a cache, the methods described above provide that the file data can be accessed quicker than is possible from the computers persistent memory, such as the computers hard disk. Furthermore, the methods of performing asynchronous malware scanning described above do not introduce any additional risk to the security of the computer system when compared with conventional synchronous malware scanning methods, as neither synchronous nor asynchronous malware scanning enable the filter unit to prevent the data from being written to the file nor prevent the file handle from subsequently being closed. In addition, the methods described above can exploit the multi-processor, multi-tasking, multi-threading and hyper-threading capabilities of modern computer systems (see Intel® Hyper-Threading Technology, Technical User's Guide, January 2003) to further improve the performance of a computer system when implementing on-access malware scanning, by allowing the scanning of file data to occur in parallel with the operations of the application that is writing data to files.

It will be appreciated by the person of skill in the art that various modifications may be made to the above described embodiments without departing from the scope of the present invention.

The invention claimed is:

1. A method of scanning a computer system for malware, the method comprising:
   determining when an application being executed on the computer system is attempting to open a file including intercepting messages that request the creation of a new file or opening of an existing file;
   intercepting a response to any detected file open request messages in order to obtain a handle assigned to the file;
   using said handle to intercept write operations to said file by said application;
   copying data written to the open file by the application into a malware scanner queue; and
   notifying the application that the file has been closed and then scanning the queued file data to determine if the data relates to potential malware.

2. The method as claimed in claim 1, wherein the file open request messages are I/O Request Packets, IRP, containing an IRP_MJ_CREATE function code.

3. The method as claimed in claim 1, wherein the step of copying data written to the open file by the application into a malware scanner queue comprises:
   copying the data as the data is written to the open file by the application; and
   adding the copied file data into the malware scanner queue.

4. The method as claimed in claim 3, wherein the step of copying data as the data is written to the open file by the application comprises:
   intercepting messages that request data be written to the file, and copying the data identified in the request.

5. The method as claimed in claim 4, wherein the write data request messages are IRPs containing an IRP_MJ_CREATE function code.

6. The method as claimed in claim 3, and further comprising:
   determining if the application has initiated closure of the file before adding the copied file data the malware scanner queue.

7. The method as claimed in claim 6, wherein the step of determining if the application has initiated closure comprises:
   intercepting messages that request the file be closed.

8. The method as claimed in claim 7, wherein the file close request messages are IRPs containing an IRP_MJ_CLEANUP or IRP_MJ_CLOSE function code.

9. The method as claimed in claim 1, wherein the step of adding data written to the open file by the application into a malware scanner queue comprises:
   recording a location of the file; and
   adding the recorded file location into the malware scanner queue.

10. The method as claimed in claim 9, wherein the step of recording a location of the file comprises:
    intercepting messages that request data be written to the file, and recording the file location identified in the request.

11. The method as claimed in claim 10, wherein the write data request messages are IRPs containing an IRP_MJ_CREATE function code.

12. The method as claimed in claim 9, and further comprising:
    determining if the application has initiated closure of the file before adding the file location into the malware scanner queue.

13. The method as claimed in claim 12, wherein the step of determining if the application has initiated closure comprises:
    intercepting messages that request the file be closed.

14. The method as claimed in claim 13, wherein the file close request messages are IRPs containing an IRP_MJ_CLEANUP or IRP_MJ_CLOSE function code.

15. The method as claimed in claim 1, and further comprising:
    recording the time at which the file data was written to the file.

16. The method as claimed in claim 15, wherein, after the application has initiated closure of the file, the queued file data is only scanned when the age of the file data exceeds a threshold.

17. The method as claimed in claim 1, wherein, after the application has initiated closure of the file, the queued file data is only scanned when the amount of data in the queue exceeds a threshold.

18. A non-transitory computer storage medium having stored thereon a computer program comprising computer program code means adapted to perform the following steps:
    determine when an application being executed on a computer system is attempting to open a file including intercepting messages that request the creation of a new file or opening of an existing file;
    intercept a response to any detected file open request messages in order to obtain a handle assigned to the file;
    use said handle to intercept write operations to said file by said application;

copy data written to the open file by the application into a malware scanner queue; and notify the application that the file has been closed and then scanning the queued file data to determine if the data relates to potential malware.

19. A computer system configured to scan files for malware, the computer system comprising:

a malware scanner configured to scan data for malware; and a processor coupled to memory, the processor configured to determine when an application being executed on the computer system is attempting to open a file including intercepting messages that request the creation of a new file or opening of an existing file, to intercept a response to any detected file open request messages in order to obtain a handle assigned to the file, to use said handle to intercept write operations to said file by said application, to copy data written to the open file by the application into a malware scanner queue, and to notify the application that the file has been closed and then scanning the queued file data to determine if the data relates to potential malware.

\* \* \* \* \*

UNITED STATES PATENT AND TRADEMARK OFFICE
CERTIFICATE OF CORRECTION

| | | |
|---|---|---|
| PATENT NO. | : 8,918,874 B2 | Page 1 of 1 |
| APPLICATION NO. | : 12/800889 | |
| DATED | : December 23, 2014 | |
| INVENTOR(S) | : Turbin | |

It is certified that error appears in the above-identified patent and that said Letters Patent is hereby corrected as shown below:

IN THE CLAIMS:

Claim 19, col. 11, line 10 "a processor coupled to memory," should be deleted.

Signed and Sealed this
Thirty-first Day of March, 2015

Michelle K. Lee
*Director of the United States Patent and Trademark Office*